(12) United States Patent
Lee

(10) Patent No.: US 6,405,365 B1
(45) Date of Patent: Jun. 11, 2002

(54) COMPUTER PROGRAM COMMAND GENERATOR AND PARSER

(75) Inventor: Steven Lee, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/346,875

(22) Filed: Jul. 2, 1999

(51) Int. Cl.[7] .............................. G06F 9/44; G06F 9/45
(52) U.S. Cl. ...................................... 717/106; 717/143
(58) Field of Search ............................... 717/2, 8, 106, 717/108, 143; 707/1, 100; 704/7, 9

(56) References Cited

U.S. PATENT DOCUMENTS

| | | | | |
|---|---|---|---|---|
| 4,686,623 A | * | 8/1987 | Wallace | 717/8 |
| 5,732,274 A | * | 3/1998 | O'Neill | 717/5 |
| 5,774,726 A | * | 6/1998 | Ahmed | 717/5 |
| 5,854,930 A | * | 12/1998 | McLain, Jr. et al. | 717/5 |
| 6,134,709 A | * | 10/2000 | Pratt | 717/8 |
| 6,138,272 A | * | 10/2000 | Tonouchi | 717/5 |
| 6,237,136 B1 | * | 5/2001 | Sadahiro | 717/2 |
| 6,286,035 B1 | * | 9/2001 | Gillis et al. | 709/206 |

OTHER PUBLICATIONS

Ruschitzka & Clevenger, "Heterogeneous Data Translation Based on Environment Grammars," IEEE Transactions of Software Engineering, vol. 15, No. 10, Oct. 1989, pp. 1236–1251.*

* cited by examiner

Primary Examiner—Tuan Q. Dam
(74) Attorney, Agent, or Firm—Hickman Palermo Truong & Becker LLP

(57) ABSTRACT

A system is provided for generically generating and parsing instructions. The system generates instructions from data that specifies values for attributes of those instructions, such as values for variables, and, conversely, generates attribute values for instructions by parsing instructions. The mechanism uses syntax data that defines commands in a computer language. The same syntax data may be used to both generate instructions and to generate attribute values for instructions by parsing. In addition, generated attribute values may be applied to syntax data describing commands in another computer language to produce instructions in the other computer language.

20 Claims, 8 Drawing Sheets

COMPUTER PROGRAM COMMAND GENERATOR AND PARSER

FIELD OF THE INVENTION

The present invention relates to parsing instructions of a computer program and generating instructions that may be executed by a computer.

BACKGROUND OF THE INVENTION

The use of networks is proliferating. As the use of networks increases, the dependency of network users upon networks increases, and the capability to manage networks becomes more critical. A key element to managing a network is network device management software, and in particular, the user interface through which the user interacts with the network device management software. Network device management software is software used to monitor and configure a particular network element. A network element is a computer system primarily dedicated to processing network traffic on a network. Network elements include network devices, such as routers, gateways, and switching devices.

A conventional user interface is a command line interface. A command line interface is a text based interface through which a user inputs keywords and other parameters. The keywords and other parameters represent commands in a computer language. The interface usually transmits the user inputted commands to the network element specified by the user, and in particular, to a process on the specified network element that decodes the commands and carries out the tasks indicated by the commands ("command processor").

The commands that may be supported are numerous, and include commands for configuring a network element, or commands for retrieving information about the state of the particular network element. Examples of commands include a command for shutting down a port, a command for retrieving information about whether a port is operational, active or inactive. Each command may be associated with one or more arguments.

To set a property of a network element to a particular state, an instruction may be issued that specifies an argument value for a pre-determined argument of the command. Command names and the arguments are pre-defined in a grammar. The argument corresponds to the property; the value specifies the desired state for that property. For example, the following two lines each illustrate instructions that specify commands used to manage a network element. The commands conform to the Internetworking Operating System (IOS), an network operating system language provided by Cisco Systems, Incorporated, of San Jose, Calif.

interface ethernet 0 ip address 200.1.1.1. subnet 255.255.255.0

The two above instructions are issued to configure a particular port "0" as a particular port type, and to associated an IP ("internet protocol") address and a subnet mask to associate with the port.

Many command processors are configured to supply data specifying the state of a network element. The command processors communicate the state by generating and transmitting text output that is identical to text instructions that may be used to set the network element to that state. For example, in response to receiving the line below, show running-config a command processor outputs many lines of text including the following below:

. . .

interface ethernet 0 ip address=200.1.1.1 subnet=255.255.255.0

. . .

One advantage of the command line processor is that it may be run by any computer coupled to a network that is configured to run as a text-based or character terminal, such as workstations and personal computers that may run terminal emulators. A disadvantage of the command line interface is that it requires a user to know numerous commands, which may be cryptic, especially to a user whose use of the command line interface is intermittent. In addition, the command line interface is subject to other well known limitations. Lines of commands and responses scroll rapidly off the screen.

A mechanism that addresses the drawbacks of the command line interface is a graphical user interface ("GUI"). A GUI displays one or more windows with graphical controls, such as menus, list boxes, action buttons, and radio buttons. Many of the graphical controls are labeled. The graphical icons and labels communicate the current state of a network element, and how they may be manipulated to change the state of a network element. The GUI generates data indicating the properties to change and the new values for those properties. The GUI output is used to generate the instructions needed to effect the desired changes. Information to display within a GUI about a particular network element is generated from a command lines supplied by the network element to reflect its state. These command lines are parsed to extract information that is displayed in the GUI.

The set of commands a command processor processes is referred to as a command set. Command sets, and their syntaxes, vary between the command processors that reside on various types of network elements, including network elements from the same manufacturer. Thus, a GUI that is used with a set of network elements must be configured to interact with a variety of command sets. When it is desired to use a GUI with a new type of network element, the GUI may have to be reprogrammed. The cost of reprogramming new releases of the GUI and deploying the new releases, to keep pace with network elements and their new command sets, is a significant disadvantage.

Based on the foregoing, it is clearly desirably to provide a mechanism that parses command lines to extract information and that generates command lines from such information, and that may be easily and efficiently adapted to new command sets as they evolve.

SUMMARY OF THE INVENTION

The foregoing needs and objects, and other needs and objects that will become apparent from the following description, are achieved by the present invention, which comprises, in one aspect, a system for generically generating and parsing instructions to network elements. The system generates instructions from data that specifies values for attributes of those instructions, such as values for variables, and, conversely, generates attribute values for instructions from by parsing instructions. The mechanism uses syntax data that defines commands in a computer language. The same syntax data may be used to both generate instructions and to generate attribute values for instructions by parsing. In addition, the generated attribute values may be applied to syntax data describing commands in another computer language to produce instructions in the other computer language.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A system for generically generating and parsing instructions is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Context

A system for generically generating and parsing instructions is described. The system automatically generates instructions from data that specifies values for attributes of those instructions, such as values for variables, and, conversely, generates attribute values for instructions by parsing instructions. The system uses syntax data that defines commands in a computer language. The same syntax data may be used to both generate instructions and to generate attribute values for instructions by parsing. In addition, the generated attribute values may be applied to syntax data describing commands in another computer language to produce instructions in the other computer language.

Figure 1:
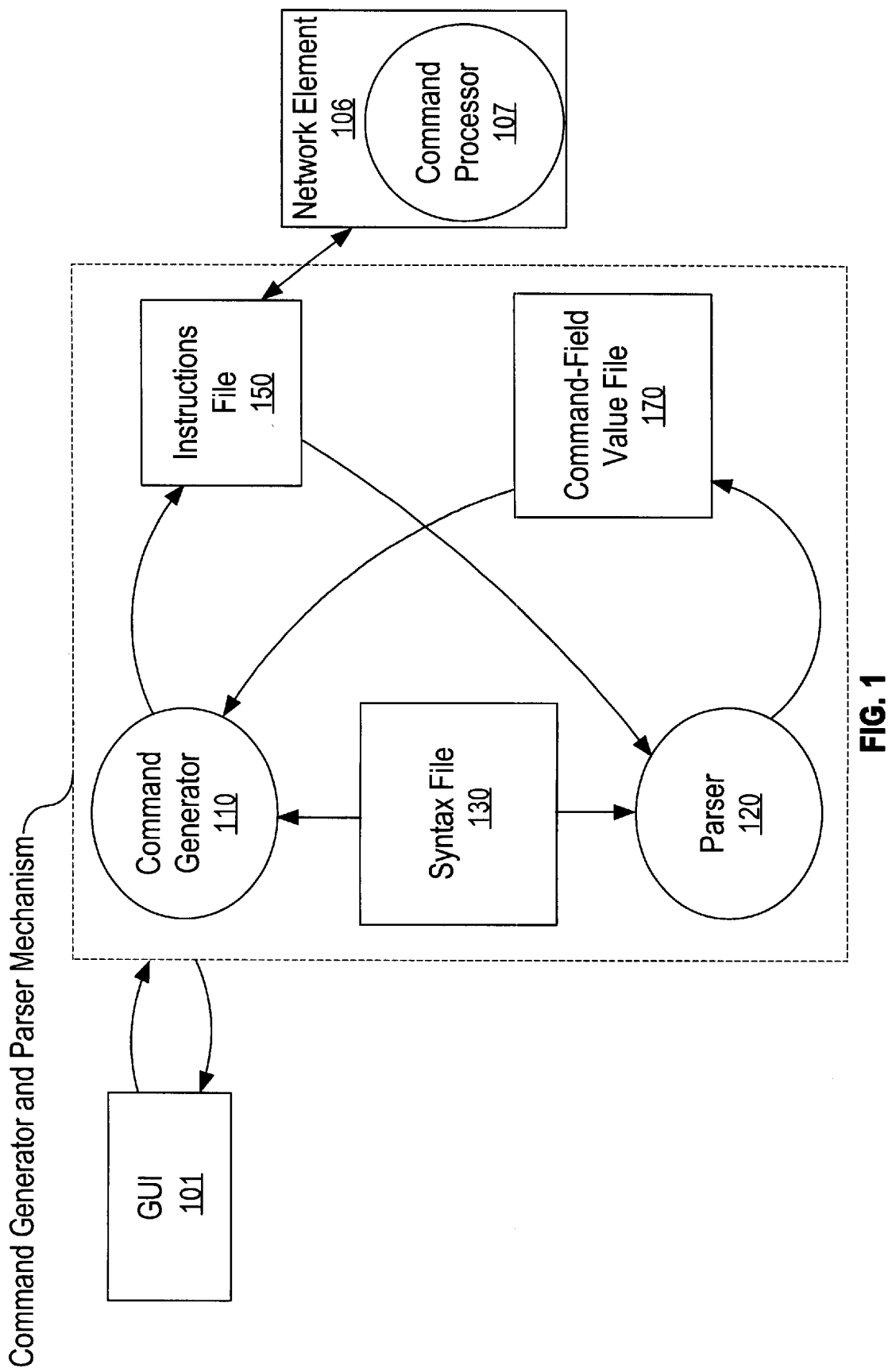
FIG. 1 is a block diagram depicting a mechanism for generically generating and parsing instructions.

FIG. 1 is a block diagram depicting a Command Generator and Parser Mechanism 100 according to an embodiment. Command Generator and Parser Mechanism 100 may reside on a computer system along with GUI 101. The computer system may be connected via a network to Network Element 106. Command Generator and Parser Mechanism 100 receives data from GUI 101, and converts the data into instructions that may be executed by Command Processor 107 on Network Element 106. Conversely, Network Element 106 transmits instructions used to represent the state of Network Element 106 to Command Generator and Parser Mechanism 100. Command Generator and Parser Mechanism 100 converts instructions into data that may be used to generate information displayed on GUI 101 about the state of Network Element 106.

Command Generator and Parser Mechanism 100 includes a Command Generator 110, Parser 120, Syntax File 130, Instructions File 150, and Command-Field Value File 170. Syntax File 130 contains metadata that specifies the syntax of commands of a computer language, such as IOS. The computer language may be executed by Command Processor 106 or any other computer entity capable of interpreting or executing instructions.

Command Generator 110 generates instructions stored in Instructions File 150. Command Generator 110 generates instructions by applying Syntax File 130 to data in Command-Field Value File 170. The instructions in Instructions File 150 represent instructions that may be transmitted to Network Element 106 for execution.

An instruction is an instantiation of a command. Each instruction has attributes referred to as Command Fields, such as a command name, an argument name, and argument values. The following instruction is provided as an illustration.

isdn spid1 123

The preceding instruction has three Command Fields: (1) a command name 'isdn', (2) an argument name 'spid1', and (3) an argument value '123'.

Command-Field Value File 170 contains records ("Command-Field Records") that each specify a set of Command-Field Values for one or more instructions. Command-Field Value File 170 may be data generated from the output supplied by GUI 101.

Parser 120 generates Command-Field Values by parsing instructions and stores the Command-Field Values in Command-Field Records in Command-Field Value File 170. Parser 120 parses Instructions File 150 according to Syntax File 130. Command-Field Records from Command-Field Value File 170 may be supplied to GUI 101, which GUI 101 uses to generate and display information about a particular state of a network element.

While Instructions File 150 and Command-Field Value File 170 have been described as files, the information they contain can be stored in any type of data storage mechanism. For example, instructions stored in Instructions File 150 may be stored as objects developed through object oriented technology. Data stored in Command-Field Value File 170 may be stored as fields in a database, which may be updated and retrieved using a database language. The term record is used to generally refer to any data element that may used to store a collection of one or more attributes about a particular entity or set of entities. Examples of records include objects, elements in an array, or rows in a database table.

Figure 2:
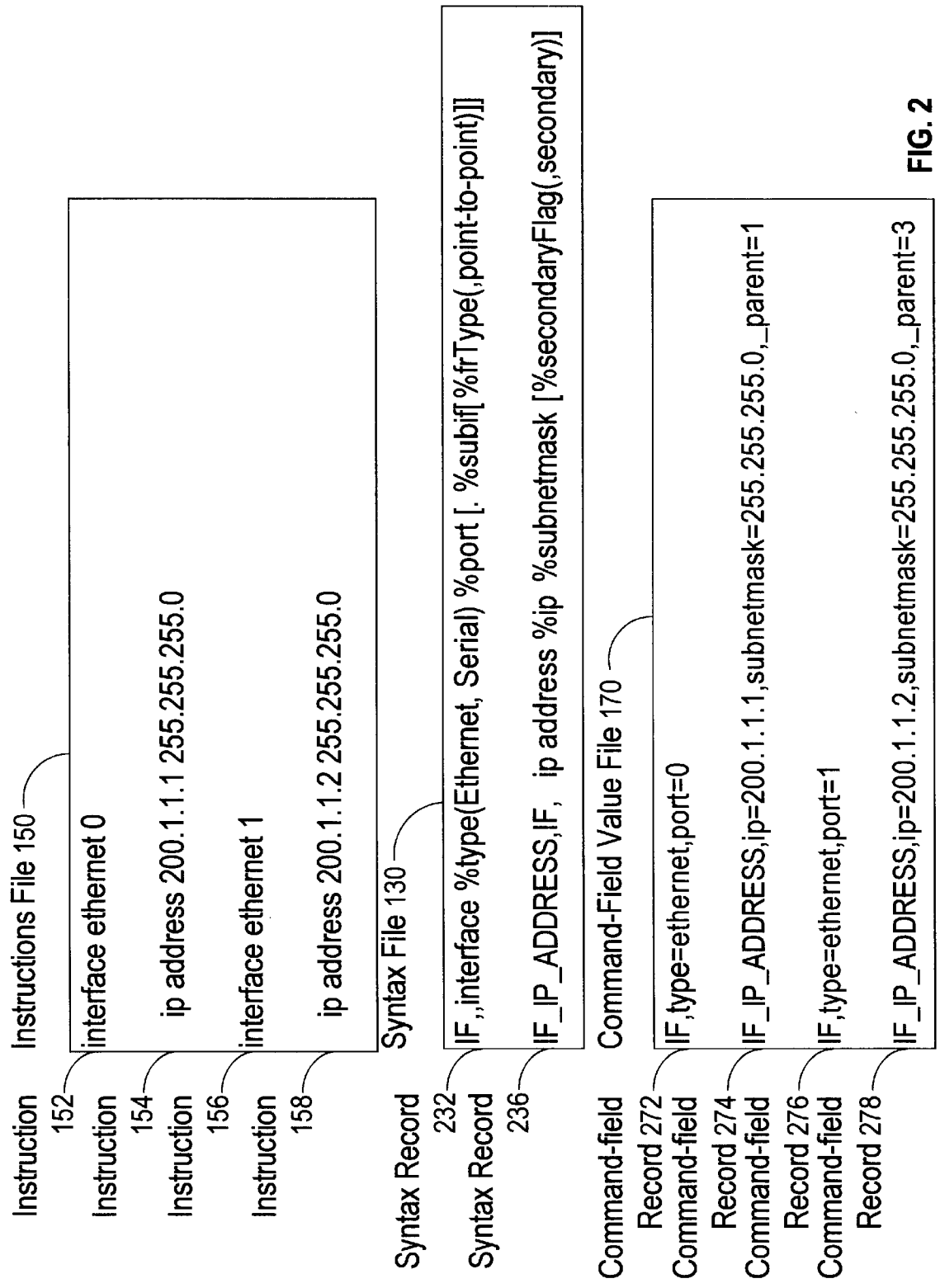
FIG. 2 is a block diagram depicting an Instruction File, Syntax File, And Command-Field Value File.

FIG. 2 shows Command-Field Value File 170, Syntax File 130, and Instructions File 150 in greater detail. Instructions File 150 contains instructions that conform to a computer language, and in particular, instructions that specify commands and that may be used to set properties of a network element.

Syntax Records

Syntax File 130 shows syntax records which describe the syntax of a command. A syntax record may contains the following comma delimited fields.

<command ID>,<parent command ID>,<command syntax>

The <command id> field is data used to identify a syntax record. A <command id> does not have to be unique relative to other syntax records specified in Syntax File 130. The <parent id> refers to a <command id> of a parent command. Parent commands shall be explained in greater detail. The last field is the command syntax field. This field includes patterns of characters used to specify the format of text, variables or other command fields, and other attributes of a command, as follows.

%<name>=variable name. A '$' can be used instead of a "%".

[ ]=optional parameters, which may be nested.

(value1, value2, . . . )=identifiers for enumerated values for a variable. Enumerated values are consecutive integers, beginning with, for example, zero, and identifying values that identify a particular integer. Value1 is used to identify 0, value2 is used to identify 1, and so forth. For example, '%type("Ethernet," "Serial")' specifies that for the variable %type, Ethernet identifies 0 and Serial identifies 1.

Command-Field Value File Format

The Command-Field Value File 170 contains Command-Field Records that specify Command-Field Values for a particular instruction in Instructions File 150. The format of a command-field record is as follows.

<command ID>,[<data1>[,<data2>]] . . . [parent instruction reference]

The first field, <command ID>, is used to identify a Syntax Record in Syntax File 130. The value for <command ID> should correspond to a value for a <command id> in Syntax File 130. A Syntax Record identified by associated Command-Field Record in this manner is referred to as a referenced Syntax Record with respect to the associated Command-Field Record. The remaining fields specify other Command-Field Values, such as values for variables. A value for a variable is specified by a name-value pair delimited by an '='. For example, 'type=ethernet'. Command Generator 110 applies Command-Field Values in a Command-Field Record to a referenced Syntax Record to generate an instruction.

For example, Command-Field Record 272 references Syntax Record 232 and is applied to Syntax Record 232 to generate Instruction 152. Specifically, <command-id> for both Command-Field Record 272 and Syntax Record 232 is 'IF'. Command-Field Record 272 specifies that the value for the variable %type is 'ethernet, and that the value for the variable %port is '0'.

Syntax Record 232 specifies an enumeration for the variable %type. In generating Instruction 152, Command Generator 110 may generate 'Ethernet' as the value for the variable %type, or may translate 'Ethernet' to 1.

Parent-Child Relationships

A command may affect how other instructions containing other commands are interpreted. Referring to FIG. 2, Instruction 152 specifies an "interface" command, referencing port 0. Instruction 154 is an "ip" command specifying an address for a port. The port affected by Instruction 154 is port 0 because the preceding Instruction 152 referenced that port.

To ensure that instructions that specify a particular command and commands that should be affected by the particular command are generated in the proper order, Syntax Records may specify parent-child relationships between commands. In addition, Command-Field Records may specify a parent-child relationship between a particular parent instruction and a child instruction. The Command-Field Record for the parent instruction is referred to as the Parent Command-Field Record, and the Command-Field Record for the child instruction is referred to as the Child Command-Field Record. After generating a parent instruction, Command Generator 110 generates a sequence of the "child" instructions for that parent instruction, ensuring that the parent and child instructions are generated in the proper order.

A Syntax Record with the <parent command ID> value empty does not specify a parent command. Syntax Record 232 specifies, for example, no parent command. Syntax record 236, on the other hand, specifies a child command of the command specified by Syntax Record 232.

Command-Field Record 274 specifies a value for the field <parent reference>. The value '1' is a Parent Reference that refers to a Command-Field Record 272, and in particular, refers to the sequence number of Command-Field Record 272 within Command-Field Value File 170.

Generating Instructions

Figure 3:
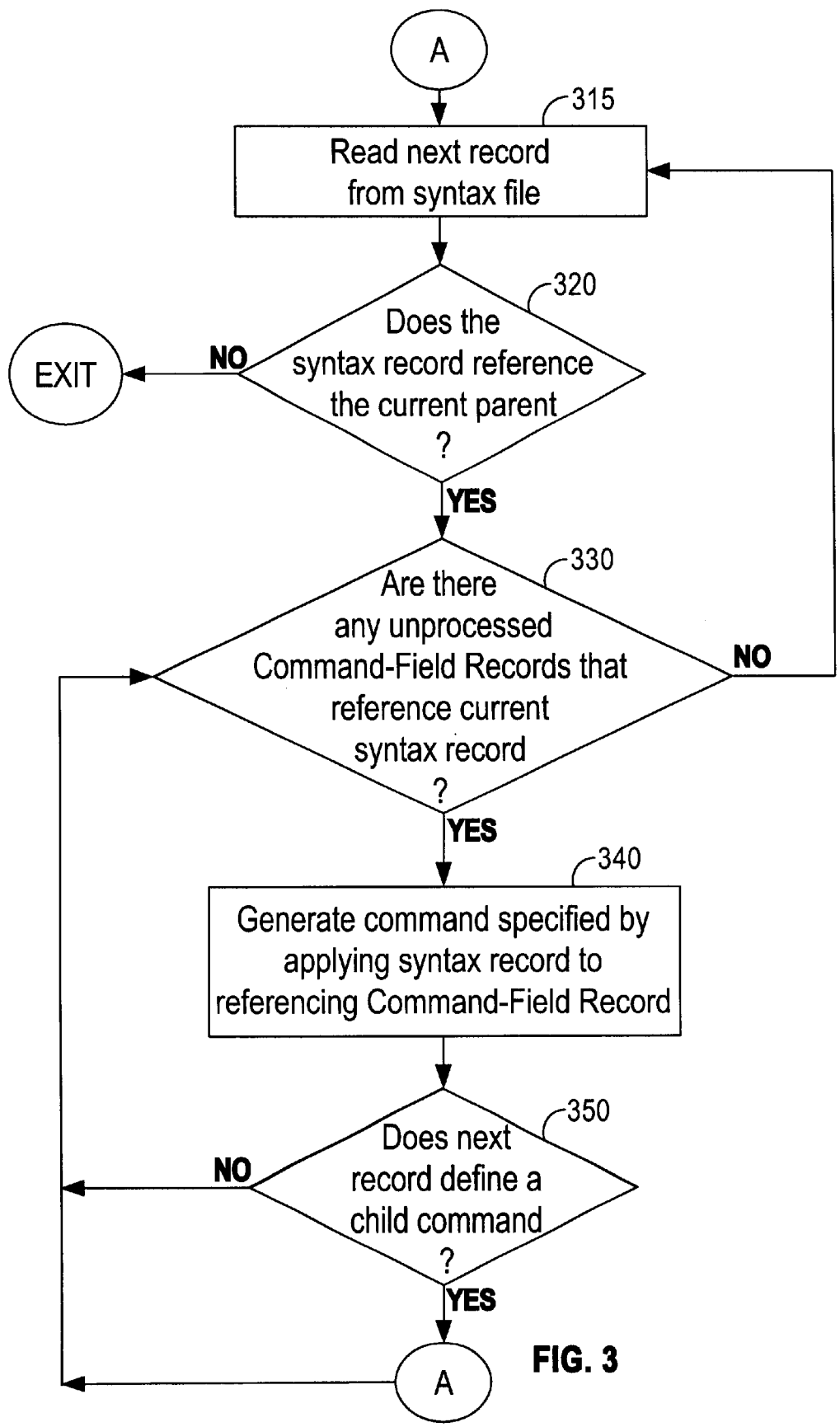
FIG. 3 is a flow chart depicting a process for generating instructions using a Syntax File and a Command-Field Value File.

FIG. 3 is a flow chart depicting a process that may be used to generate instructions that specify commands. The process is illustrated using Syntax File 130 and Command-Field Value File 170 as depicted in FIG. 2. The process generates instructions by applying Syntax Records in Syntax File 130 to Command-Field Records from Command-Field Value File 170.

The process shown in FIG. 3 is implemented in a function that is called recursively. Each level of recursion is associated with a current parent command. At the first level of recursion, the current parent command is referred to as the empty parent. A Syntax Record with an empty value in the <parent command ID> field references the empty parent. Syntax Record 232, for example, refers to the empty parent.

A second or higher level of recursion is reached when the process shown in FIG. 3 is recursively invoked to generate child instructions for a parent instruction specified by Parent Command-Field Record. The Parent Command-Field Record on whose behalf the process is recursively invoked is referred to as current parent-command field record. The command referenced by the current parent-command field record is referred to as the current parent command.

Referring to FIG. 3, at step 315, the next syntax record after the current syntax record is read, or if there is no current syntax record, the first record in Syntax File 130 is read. After the next syntax record is read, the next syntax record becomes the current syntax record for the current level of recursion. In this example, the next syntax record is Syntax Record 232, which becomes the current syntax record.

At step 320, the process determines whether the current syntax record references the current parent command. If the current syntax record references the current parent command, then control flows to step 330. Otherwise, execution of the steps ends for the current level of recursion, and control returns to the caller. In this example, the current parent command is the empty parent because the process is executing at the first level of recursion. Syntax Record 232, as mentioned previously, references the empty parent. Thus, control flows to step 330.

At block 330, the process determines whether there are any unprocessed Command-Field Records in the Command-Field Value File 170 that reference the current syntax record, Syntax Record 232. If so, then control passes to block 340. Otherwise, control returns to block 315. The term "unprocessed," as used with respect to block 330, refers to the Command-Field Record that references the current Syntax Record, and for which a determination has not been made at block 330 with respect to the current Syntax Record. In this illustration, the process determines that Command-Field Record 272 is an unprocessed Command-Field Record that references the command specified by the just read Syntax Record 232. Control therefore flows to block 340.

At block 340, an instruction that specifies a command is generated, by applying the Command-Field Values specified by Command-Field Record 272 according to the Syntax Record read at block 315. Command-Field Record 272 specifies that the value for variable %type is 'Ethernet', and that the value for %port is '0'. Accordingly, Instruction 152 is generated.

At block 350, the process determines whether the current syntax record specifies a Parent Command. If the current syntax record specifies a parent command, then the process is recursively invoked, reentering at A in FIG. 3. Otherwise, control returns to step 330. In this example, because Syntax Record 236 references, as a Parent Command, the command specified by Syntax Record 232, the current syntax record specifies a Parent Command. The process is recursively invoked.

Upon re-entry into the process at the next recursive level, the parent syntax record becomes Syntax Record 232, and the current parent command becomes the command specified by Syntax Record 232. At step 315, the next record, Syntax Record 236, is read. At step 320,it is determined that the current syntax record references as a parent the current parent command. Specifically, the <parent command id> field value of Syntax Record 236 matches the <command id> field value of Syntax Record 232. Therefore, control passes to step 330.

At step 330, the process determines that there is an unprocessed Command-Field Record in the Command-Field Value File 170 that references the current syntax record as a parent. When the current syntax record specifies a Child Command, a Command-Field Record references the current syntax record as a parent when the <parent command id> value for the current syntax record matches the <command id> value of the parent syntax record, and the <parent reference> value refers to parent command-field record. In this example, Command-Field Record 274 has a <parent command id> that references the <command id> of parent Syntax Record 232, a <parent reference> value that references the current parent Command-Field Record 272. Therefore, control returns to step 340.

At step 340, instruction 154 is generated. At step 350, it is determined that the current Syntax Record 236 is not a Parent Command. Control returns to step 330.

At step 330, the process determines that there are not any unprocessed Command-Field Records in the Command-Field Value File 170 that reference the command specified by the current syntax record, Syntax Record 236. At step 315, no syntax record is read. When no syntax record is read, there is no current syntax record, and, at step 320, the process determines that the current syntax record does not reference the current parent command.

The function at this level of recursion is exited, and execution resumes at the lower level of recursion at step 315.

At this point, the current syntax record is Syntax Record 232, and control resumes at step 330. At step 330, the process determines that Command-Field Record 276 is an unprocessed Command-Field Record that references the command specified by the current Syntax Record 232. Control therefore flows to block 340. Eventually, Instructions 156 and 158 are generated in the manner previously described for Instructions 152 and 154.

Parsing Instructions

Figure 4:
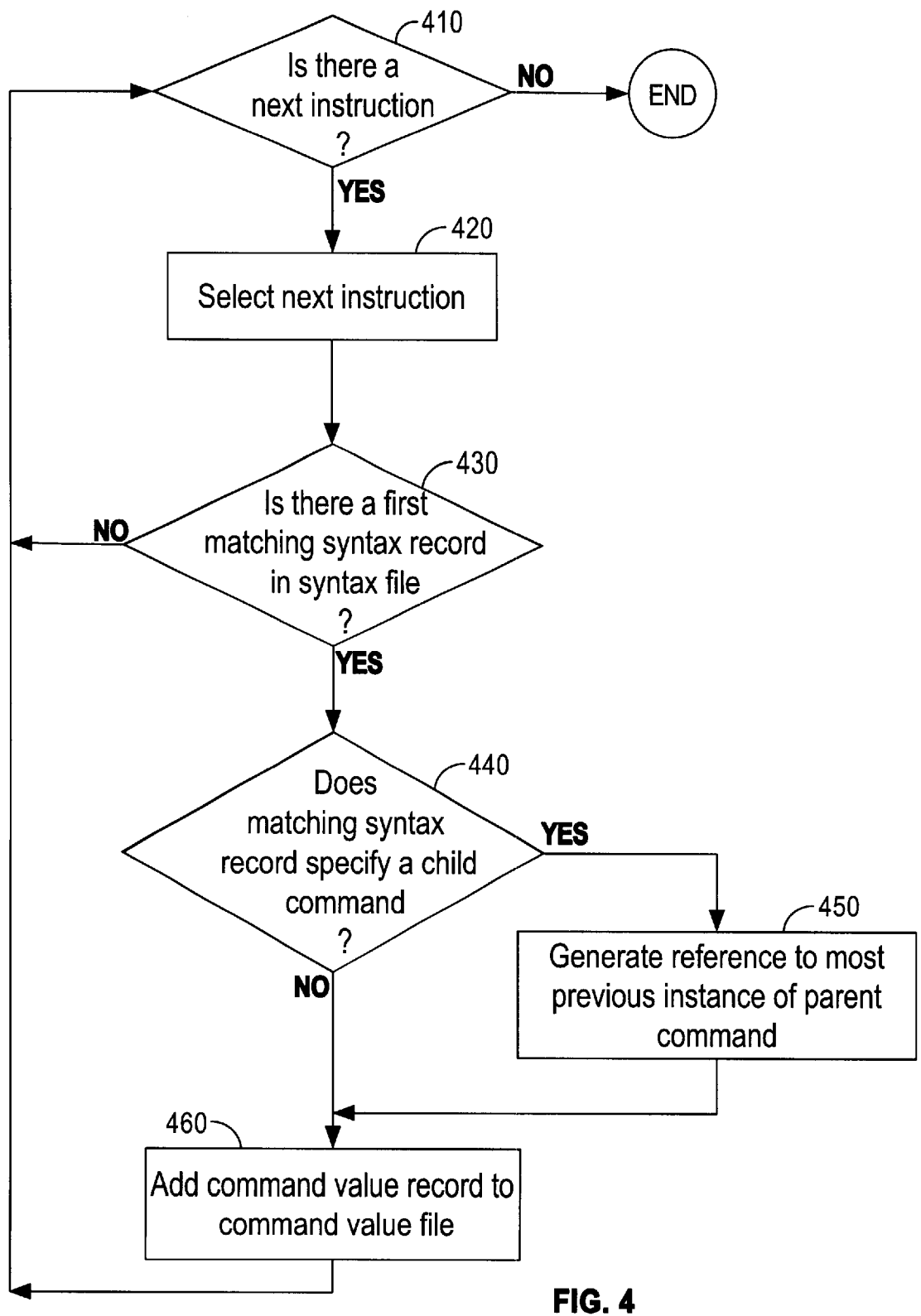
FIG. 4 is a flow chart depicting a process for generating Command-Field Records using a Syntax File and Instruction File.

FIG. 4 is a flow chart depicting a process that may be used to generate Command-Field Records by parsing instructions. The process generates Command-Field Records by examining Syntax Records in Syntax File 130 to parse Instructions from, for example, Instructions File 150. The process is illustrated using Syntax File 130, Command-Field Value File 170, and Instructions File 150 as depicted in FIG. 2.

Referring to FIG. 4, at block 410, the process determines whether there is a next instruction in Instructions File 150. The next instruction is the instruction that follows, in the current invocation of the process of FIG. 4, the most recently processed instruction from Instructions File 150, or if none, the first instruction in Syntax File 130. In this illustration, because no instruction has been selected in the illustrated invocation, there is a next instruction, namely, Instruction 152. Control then flows to block 420, where the next instruction, Instruction 152, is selected.

At block 430, the process determines whether there is a first Syntax Record in Syntax File 130 that matches the next instruction. If there is no Syntax Record in Syntax File 130 that matches, then control returns to block 410. Otherwise, control flows to block 440. In this illustration, it is determined that Syntax Record 232 matches Instruction 152.

It is possible that multiple Syntax Records may match more than one instruction in Instructions File 150. Selecting the first matching Syntax Record in Syntax Record 232 resolves such ambiguities.

At block 440, the process determines whether the first Syntax Record defines a child command. If it is determined that the first Syntax Record does not define a child command, then control flows to block 460. Otherwise, control flows to block 450. Because the <parent ID> field in Syntax Record 232 is empty, it is determined that Syntax Record 232 does not specify a child command. Therefore, control flows to block 460.

At block 460, a Command-Field Record is generated for the instruction by extracting from the instruction the Command-Field Values specified by the first Syntax Record. In this illustration, the command name identifier 'IF' is extracted from Syntax Record 232. The field values %type and %port are extracted from Instruction 152, which are the values 'ethernet' and '0' respectively.

Control returns to block 410. At block 410, it determined that there is a next instruction. At block 420, Instruction 154 is selected as the next instruction. At block 430, it determined that Syntax Record 236 is the first matching record. At block 440, it is determined that Syntax Record 236 specifies a child command, therefore control flows to block 450.

At block 450, a reference is generated to the Command-Field Record for the most previous processed instruction that specifies the parent command of the child command. In this illustration, the Syntax Record 232 specifies the parent command of the child command specified by Instruction 154. Instruction 152 is the most previous processed instruction that specifies the command. The value generated for the reference is "1" because this specifies the order of Command-Field Record 272 within Command-Field Value File 170, the Command-Field Record generated for the most previous instruction.

Command-Field Record that Maps Many Syntax Records to One

Figure 5:
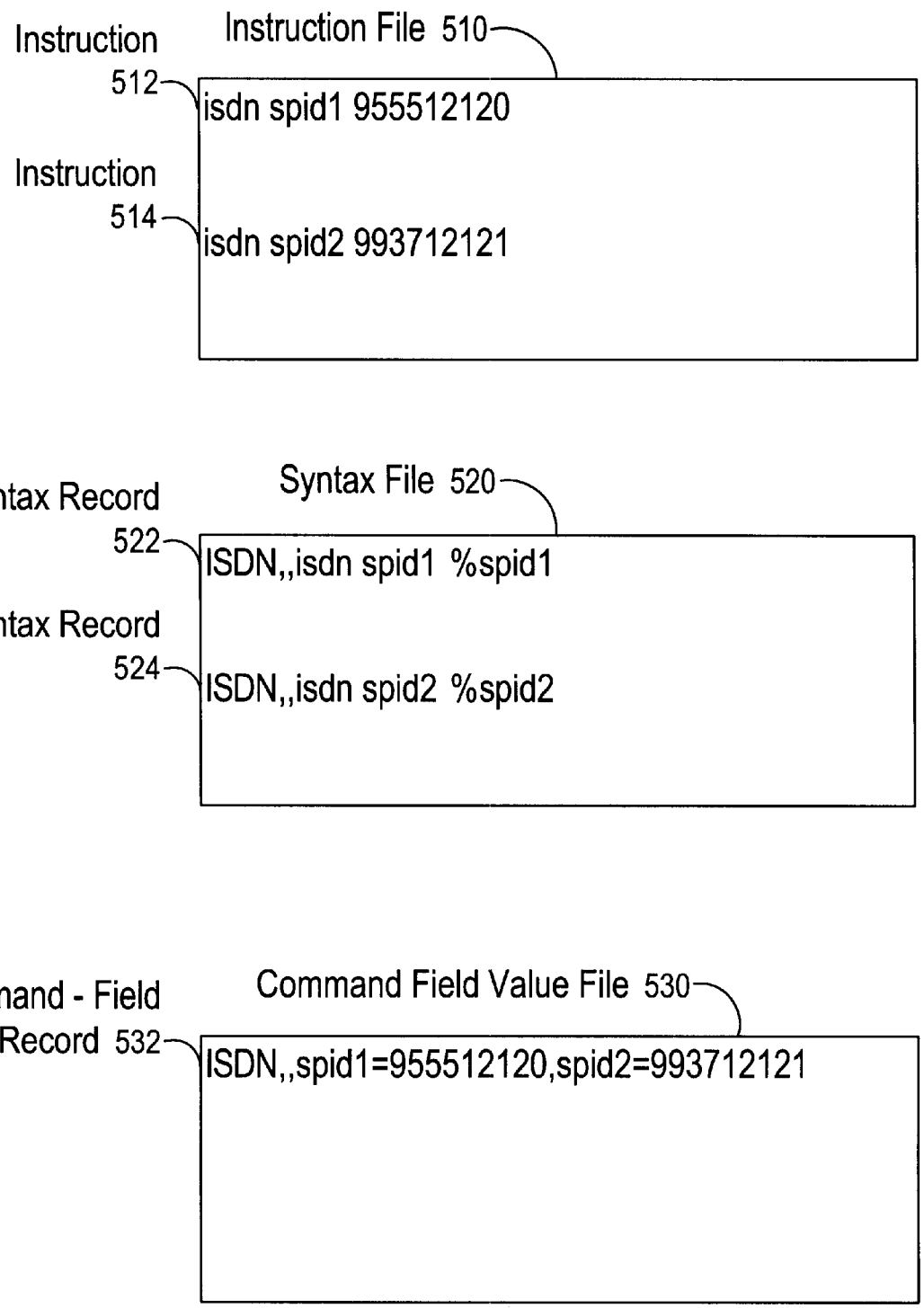
FIG. 5 is a block diagram depicting an Instruction File, Syntax File, And Command-Field Value File.

A Command Field Record does not have to uniquely refer to one command in the Syntax File 130. Thus the relationship between Command Field Records and Syntax Records in Syntax File 130 may be one-to-one or one-to-many. FIG. 5 is used to illustrate a non one-to-one relationship between Command-Field Records and Syntax Records.

FIG. 5 shows Instructions File 510, Syntax File 520, and Command-Field Value File 530. The <command id> value 'ISDN' matches the <command id> in Syntax Records 522 and 524. By executing the process shown in FIG. 3, Syntax Records 522 and 524 were applied to Command-Field Record 532, a single record, to generate two instructions, Instructions 512 and 514.

Support of many-to-one relationships is a feature that allows a particular set of Command-Field Records to be used with multiple sets of Syntax Records that each describe commands of a different language, or a variant of a computer language. For example, one version of IOS on a particular command processor supports only the one argument form of the ISDN command. The one argument form is specified by Syntax Records 522 and 524. Another version of IOS supported by another network element may support the two argument version of the ISDN command. Command-Field Value File 530 may be used to generate instructions for both the two argument form, as illustrated by FIG. 5, and the one argument form, as illustrated by FIG. 6.

Figure 6:
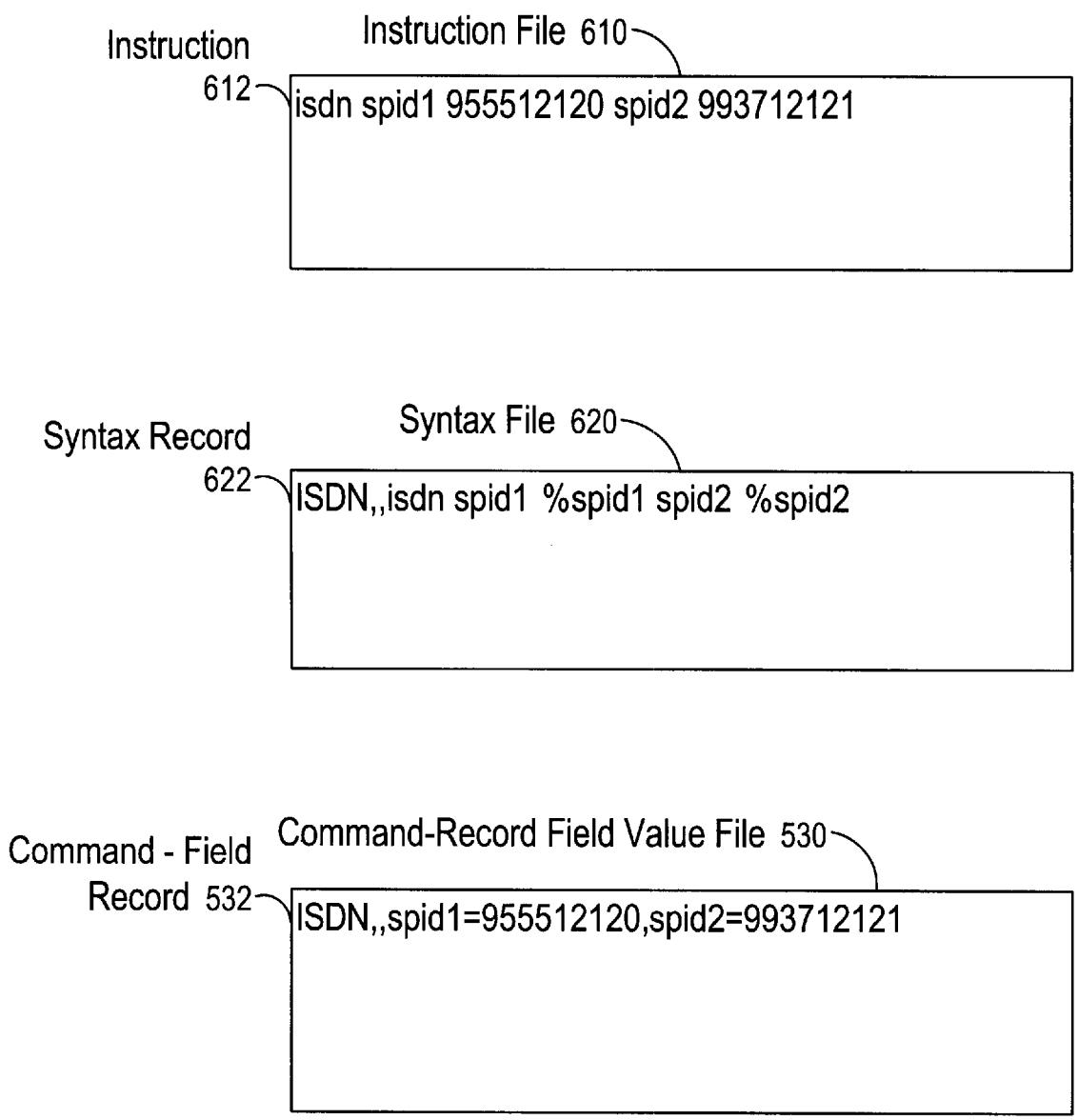
FIG. 6 is a block diagram depicting an Instruction File, Syntax File, And Command-Field Value File.

FIG. 6 shows Instructions File 610, Syntax File 620, and Command-Field Value File 530. By executing the blocks shown in FIG. 3, Syntax Record 622 was applied to Command-Field Record 532 to generate Instruction 512.

Command-Field Record Packing

When parsing a pair of instructions, two Command-Field Records may be generated. As has been demonstrated, the Command-Field Records serve to store information used to regenerate the instructions. However, it is possible to store the information needed to regenerate multiple instructions in a single combined Command-Field Record. Storing the needed information in fewer records conserves storage space.

Command-Field Record Packing refers to the process of storing information in a set of Command-Field Record in another set of Command-Field Records that contains fewer Command-Field Records. For example, the following Command Field records can be combined in Command-Field Record 532.

ISDN,,spid1=123

ISDN,,spid2=456

To combine Command-Field Records, the Command-Field Records should each refer to the same parent, or no parent at all. Command-Field Record Packing may be implemented as an option.

Smart Spacing

When applying an optional field to generate instructions, the resulting spacing between variables and strings may not conform to intuitive expectations, as expected by a human. Smart spacing refers to the process of generating spacing between commands as intuitively expected. The following examples are provided as an illustration.

[%1] abc-Case A1 abc [%1]-Case A2

[%1] [%2]-Case A3

In case #1 and #2, if the optional field is empty, the expected behavior is to generate the space, that is, generate "abc" not "abc". The term "empty" refers to an optional field for which no value is provided in an instruction. In case #3, the intuitively expected result is more complex. If either optional part is empty, the space should not be generated. However, if both optional parts are not empty, the space should not be generated.

One solutions is to include trailing spaces in an optional part, remove trailing spaces when generating or parsing instructions, while accounting for leading spaces. Trailing spaces are rarely significant, while leading spaces are used for formatting. The following examples would generate instructions or parse as intuitively expected.

[%1]abc-Case B1 abc [%1]-Case B2

[%1][%2]-Case B3

In generating instructions for case B1 and B3, the space specified by the optional part '[%1]' is not generated if the optional part itself is empty. In case B3, if the optional part specified by '[%1]' is generated and the optional part specified by '[%2]' is empty, a trailing blank is generated, but then dropped. Similarly, in case B2, if the space specified by the optional part '[%1]' is empty, the resulting trailing space is removed.

In cases B1 and B2, expected spacing may be achieved by including in the optional part leading spaces or trailing spaces. However, Case B3 is a problematic. For example:

[%1][%2]

could produce a leading blank, which would not be removed. Cases like B3 should be resolved according to the following rules

| Case: | Expected behavior |
| --- | --- |
| 1. %1 is empty, %2 is empty | "" |
| 2. %1 is not empty, %2 is empty | "%1" |
| 3. %1 is empty, %2 is not empty | "%2" |
| 4. %1 is not empty, %2 is not empty | "%1 %2" |

Finally, when parsing an instruction, any trailing spaces are not stored in a Command-Field Record.

A Command-Field Value File for Multiple Languages

Figure 7:
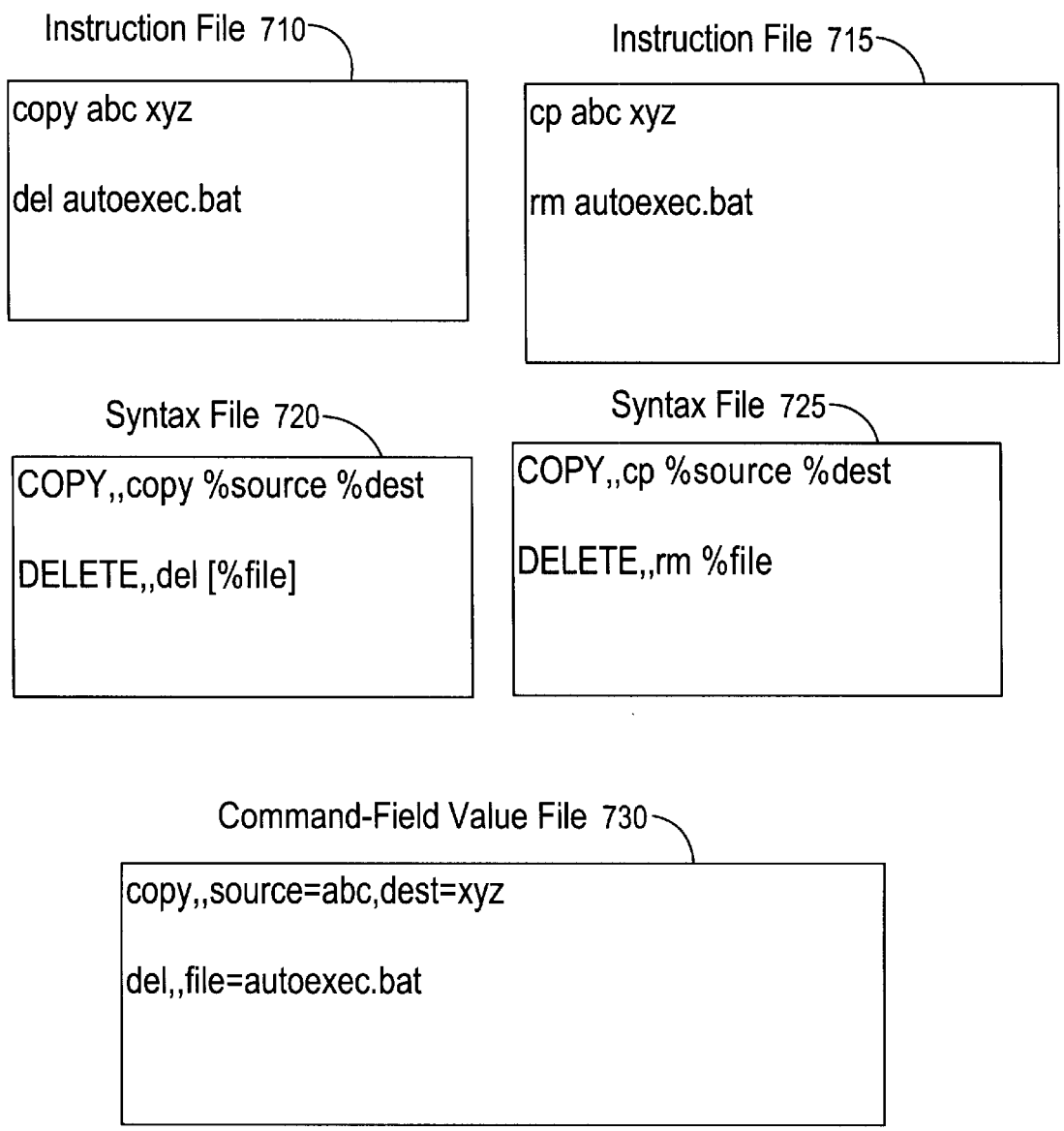
FIG. 7 is a block diagram depicting an Instruction File, Syntax File, And Command-Field Value File.

FIG. 7 is provided as a demonstration of how one set of Command-Field Records may be used to generate sets of instructions that conform to different computer languages. Syntax File 720 specifies the syntax of Microsoft DOS™ commands, while Syntax File 725 specifies the syntax of UNIX commands. Using the process depicted by FIG. 3 for generating commands, Command-Field Value File 730 may applied to Syntax Records in Syntax File 720 to generate Microsoft DOS instructions in Instructions File 710, and to Syntax Records in Syntax File 725 to generate UNIX instructions in Instructions File 715.

API to Command Generator and Parser Mechanism

According to an embodiment, an API provides functions for creating and modifying the values in Command-Field Records and for generating or parsing instructions, The API may be used to parse the instructions, make modifications to the Command-Field Value Records, and then generate back the instructions that reflect the modifications. For example, an API functions is invoked to parse IOS instructions and generate Command-Field Value Records. To change the IP address of Ethernet 0, the API may be used to find the Command-Field Record with the command-id of IF_IP_ADDRESS, and then set the value for the 'type' field to '0'. Finally, a function of the API is invoked to generate new instructions from the Command-Field Value Records.

Parsing Unknown Instructions

"Unknown commands" are commands specified by an instruction that does not match a Syntax Record. Unknown Commands may be processed in at least two ways when parsing instructions. The first way to process an unknown command is to ignore it, which is the default behavior. The second is to enable unknown command processing and to optionally provide a user-specific function on how to handle the unknown commands. The default handling is to create a syntax record with a single variable field.

Hardware Overview

Figure 8:
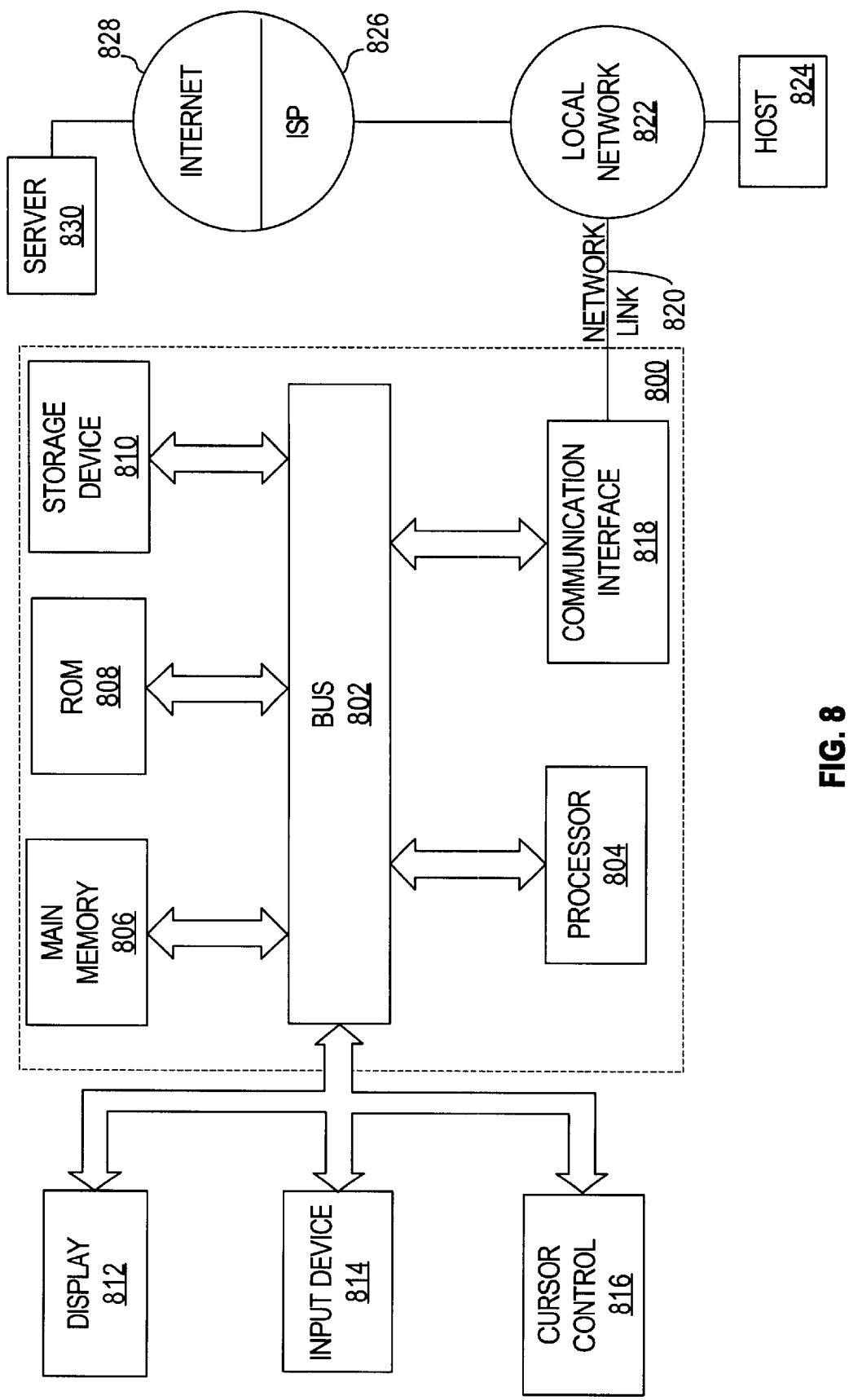
FIG. 8 is a block diagram depicting a computer system upon which an embodiment of the present invention may be implemented.

FIG. 8 is a block diagram that illustrates a computer system 800 upon which an embodiment of the invention may be implemented. Computer system 800 includes a bug 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user, An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for generically generating and parsing instructions. According to one embodiment of the invention, generically generating and parsing instructions is provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams.

The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for generically generating and parsing instructions as described herein.

The received code may be executed by processor 804 as it is received, and/or stored in storage device 810, or other non-volatile storage for later execution. In this manner, computer system 800 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of generating and parsing instructions that conform to a computer language and that are executable by a computer, the method comprising the computer inplemented steps of:

receiving syntax data describing a format of one or more instructions that conform to the computer language and one or more fields associated with the instructions;

receiving a first set of command field records that are each associated with a command and that specify at least one value for a field associated with the command;

generating a first set of instructions by applying the first set of command field records to the syntax data;

receiving a second set of instructions conforming to the computer language;

generating a second set of command field records by examining the syntax data to parse the second set of instructions.

2. The method of claim 1, wherein the syntax data includes a first syntax record that specifies a command-id associated with a first command; and wherein the step of generating a first set of instructions includes:

selecting the first syntax record, selecting a first command field record from the first set of command field records that references the command-id, and generating a first instruction of the first set of instructions by applying field values from the first command field record to the first syntax record.

3. The method of claim 1, further including the step of generating a third set of instructions by applying the first set of command field records to other syntax data describing format of instructions that conform to another computer language.

4. The method of claim 2, further including the step of generating a third set of instructions by applying the first set of command field records to other syntax data describing format of instructions that conform to another computer language.

5. The method of claim 4, wherein the other syntax data includes a second syntax record that specifies that the command-id is associated with a second command; and wherein the step of generating a third set of instructions includes:

selecting the second syntax record, selecting the first command field record by determining that the first command field record references the command-id, and generating a particular instruction of the third set of instructions by applying field values from the first command field record to the second syntax record.

6. The method of claim 1, further including the step of generating a third set of command field records by examining to parse the second set of instructions syntax data describing format of instructions that conform to another computer language.

7. The method of claim 1, wherein each field of a set of fields corresponds to a field value of at least one record of the second set of command field records; and wherein the method further includes the step of storing the second set of command field records in at least one database table with columns that correspond to a field from the set of fields.

8. The method of claim 1, wherein syntax data includes a parent syntax record and at least one child syntax record that contains a flag identifying the parent syntax record.

9. The method of claim 8, wherein the at least one child syntax record specifies a child command and the parent command syntax record specifies a parent command;

wherein the step of generating a second set of command field records includes:

identifying at least one child instruction that specifies the child command specified by the child syntax record;

identifying a parent command field record for the parent command specified by the parent syntax record; and generating for the at least one child instruction a command field record that refers to the parent command field record.

10. The method of claim 9, wherein the step of identifying a parent command field record includes identifying the command field record that corresponds to the parent instruction that most immediately precedes each child instruction.

11. The method of claim 1, wherein the step of generating a second set of command field records includes combining a plurality of records.

12. The method of claim 11, wherein the step of combining a plurality of records includes combining a plurality of records that are each associated with an identical parent syntax record from the syntax data.

13. The method of claim 1, wherein the step of generating a first set of instructions includes generating a first instruction and a second instruction by applying values from only one command field record from the first set of command field records to at least two syntax records from the syntax data.

14. A method of generating and parsing instructions that conform to a computer language and that are executable by a computer, the method comprising the computer implemented steps of:

receiving a first set of syntax records that each:
  describe a format of instructions that conform to a first computer language, specifies one or more fields associated with the instructions that conform to the first computer language, and
  specifies a command id associated with a command from the first computer language;
receiving a second set of syntax records that each:
  describe a format of instructions that conform to a second computer language,
  specifies one or more fields associated with the instructions that conform to the second computer language, and
  specifies a command id associated with a command from the second computer language;
receiving a set of command field records that are each associated with a command id;
selecting a first syntax record that
  is from the first set of syntax records, and
  and that references a particular command id;
selecting one or more command field records from the set of command field records that reference the particular command-id;
for each selected command field record, generating an instruction by applying field values from the selected command field record to the first syntax record;
selecting a second syntax record that
  is from the second set of syntax records, and
  and that references the particular command id;
selecting the one or more command field records from the set of command field records that reference the command-id; and
for each selected command field record, generating an instruction by applying field values from the selected command field record to the second syntax record.

15. A computer system, comprising
  a command generator configured to generate a first set of instructions by applying a first set of command field records to syntax data that describes one or more instructions that conform to a computer language and one or more fields associated with the instructions; and
  a parser configured to generate a second set of command field records by examining the syntax data to parse a second set of instructions that conform to the computer language.

16. A computer-readable medium carrying one or more sequences of one or more instructions for generating and parsing instructions that conform to a computer language and that are executable by a computer, the one or more sequences of one or more instructions including instructions which, when executed by one or more processors, cause the one or more processors to perform the steps of:

receiving syntax data describing a format of one or more instructions that conform to the computer language and one or more fields associated with the instructions;
receiving a first set of command field records that are each associated with a command and that specify at least one value for a field associated with the command;
generating a first set of instructions by applying the first set of command field records to the syntax data;
receiving a second set of instructions conforming to the computer language;
generating a second set of command field records by examining the syntax data to parse the second set of instructions.

17. The computer-readable medium of claim 16,
  wherein the syntax data includes a first syntax record that specifies a command-id associated with a first command; and
  wherein the step of generating a first set of instructions includes:
    selecting the first syntax record,
    selecting a first command field record from the first set of command field records that references the command-id, and
    generating a first instruction of the first set of instructions by applying field values from the first command field record to the first syntax record.

18. The computer-readable medium of claim 17, further including sequences of instructions for performing the step of generating a third set of instructions by applying the first set of command field records to other syntax data describing format of instructions that conform to another computer language.

19. The computer-readable medium of claim 18, further including sequences of instructions for performing the step of generating a third set of instructions by applying the first set of command field records to other syntax data describing format of instructions that conform to another computer language.

20. The computer-readable medium of claim 19,
  wherein the other syntax data includes a second syntax record that specifies that the command-id is associated with a second command; and
  wherein the step of generating a third set of instructions includes:
    selecting the second syntax record,
    selecting the first command field record by determining that the first command field record references the command-id, and
    generating a particular instruction of the third set of instructions by applying field values from the first command field record to the second syntax record.

* * * * *

UNITED STATES PATENT AND TRADEMARK OFFICE
CERTIFICATE OF CORRECTION

PATENT NO.    : 6,405,365 B1
DATED         : June 11, 2002
INVENTOR(S)   : Lee

It is certified that error appears in the above-identified patent and that said Letters Patent is hereby corrected as shown below:

<u>Column 13,</u>
Line 29, replace "inplementing" with -- implementing --.

Signed and Sealed this

Eighth Day of October, 2002

Attest:

Attesting Officer

JAMES E. ROGAN
*Director of the United States Patent and Trademark Office*